(12) United States Patent
George et al.

(10) Patent No.: US 9,665,602 B1
(45) Date of Patent: May 30, 2017

(54) SYSTEM, METHOD, AND COMPUTER PROGRAM FOR MIGRATING INTERDEPENDENT DATA OBJECTS FROM A FIRST DEVICE TO A SECOND DEVICE

(71) Applicant: Amdocs Software Systems Limited, Dublin (IE)

(72) Inventors: Christopher James George, Priddy (GB); Ulf Mathias Landby, London (GB); Stephen Palmer, Bradford on Avon (GB); Paul Michael McHugh, Bath (GB)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 449 days.

(21) Appl. No.: 14/243,811

(22) Filed: Apr. 2, 2014

Related U.S. Application Data (60) Provisional application No. 61/807,352, filed on Apr. 2, 2013.

(51) Int. Cl.
*G06F 17/30* (2006.01)
(52) U.S. Cl.
CPC .................... *G06F 17/303* (2013.01)
(58) Field of Classification Search
CPC .................................................... G06F 17/303
USPC .......................................................... 707/610
See application file for complete search history.

(56) References Cited

U.S. PATENT DOCUMENTS

2009/0106255 A1* 4/2009 Lacapra ............... G06F 11/1076
2009/0222691 A1* 9/2009 Riemers ................ G06F 17/303
714/18

* cited by examiner

*Primary Examiner* — Mahesh Dwivedi
*Assistant Examiner* — Johnese Johnson
(74) *Attorney, Agent, or Firm* — Zilka-Kotab, PC (57) ABSTRACT

A system, method, and computer program product are provided for migrating interdependent data objects from a first device to a second device. In use, at least one first data object to be migrated from a first device to a second device associated with a target code is received. Further, it is determined that the second device associated with the target code requires at least one second data object to be present at least one of before the at least one first data object or at a same time as the at least one first data object. Additionally, the at least one first data object to be migrated from the first device to the second device associated with the target code is stored in a cache. Furthermore, an interdependency event associated with the at least one first data object and the at least one second data object is detected. In response to detecting the interdependency event, the at least one second data object to be migrated from the first device to the second device associated with the target code is received. Moreover, the at least one first data object and the at least one second data object are automatically sent to the second device associated with the target code, in response to receiving the at least one second data object.

20 Claims, 7 Drawing Sheets

SYSTEM, METHOD, AND COMPUTER PROGRAM FOR MIGRATING INTERDEPENDENT DATA OBJECTS FROM A FIRST DEVICE TO A SECOND DEVICE

CLAIM OF PRIORITY

This application claims the benefit of U.S. Provisional Application No. 61/807,352, filed Apr. 2, 2013, the entire contents of which are incorporated herein by reference.

FIELD OF THE INVENTION

The present invention relates to computer infrastructures, and more particularly to updating such computer infrastructures.

BACKGROUND

Many telecommunications providers are investing significant effort to simplify and consolidate their software infrastructure, often replacing multiple legacy applications with a single COTS (Commercial Off-The-Shelf) application. Part of the consolidation process involves migrating data from legacy applications (i.e. source applications) to new target applications, and then capturing subsequent changes to the data in the legacy applications and replicating those changes to the target application in near real-time.

Changes captured in the legacy applications may not necessarily be applied to the target application in the same order as received, due to data and/or application programming interface (API) restrictions in the target application. There is thus a need for addressing these and/or other issues associated with the prior art.

SUMMARY

A system, method, and computer program product are provided for migrating interdependent data objects from a first device to a second device. In use, at least one first data object to be migrated from a first device to a second device associated with a target code is received. Further, it is determined that the second device associated with the target code requires at least one second data object to be present at least one of before the at least one first data object or at a same time as the at least one first data object. Additionally, the at least one first data object to be migrated from the first device to the second device associated with the target code is stored in a cache. Furthermore, an interdependency event associated with the at least one first data object and the at least one second data object is detected. In response to detecting the interdependency event, the at least one second data object to be migrated from the first device to the second device associated with the target code is received. Moreover, the at least one first data object and the at least one second data object are automatically sent to the second device associated with the target code, in response to receiving the at least one second data object.

DETAILED DESCRIPTION

Figure 1:
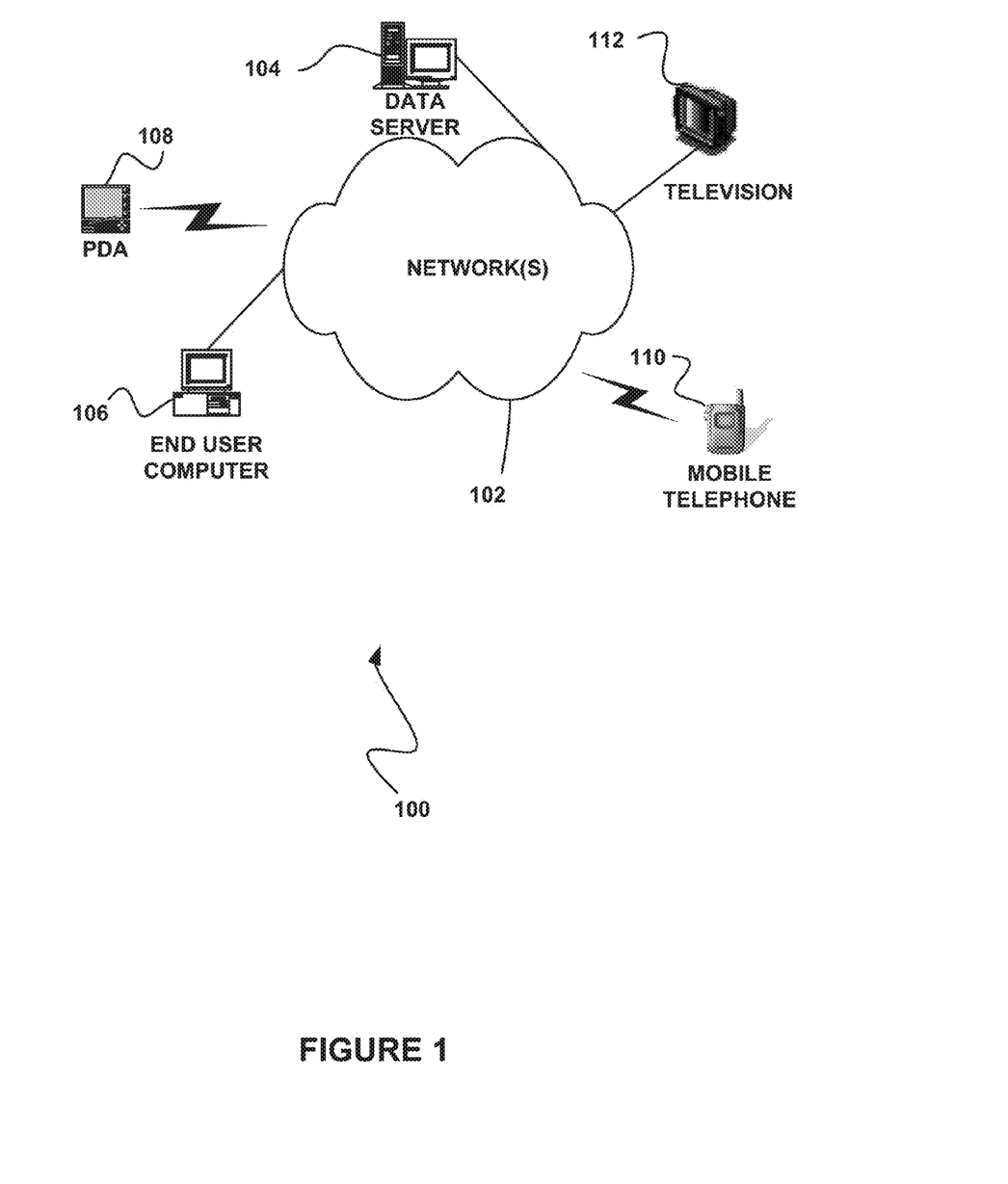
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
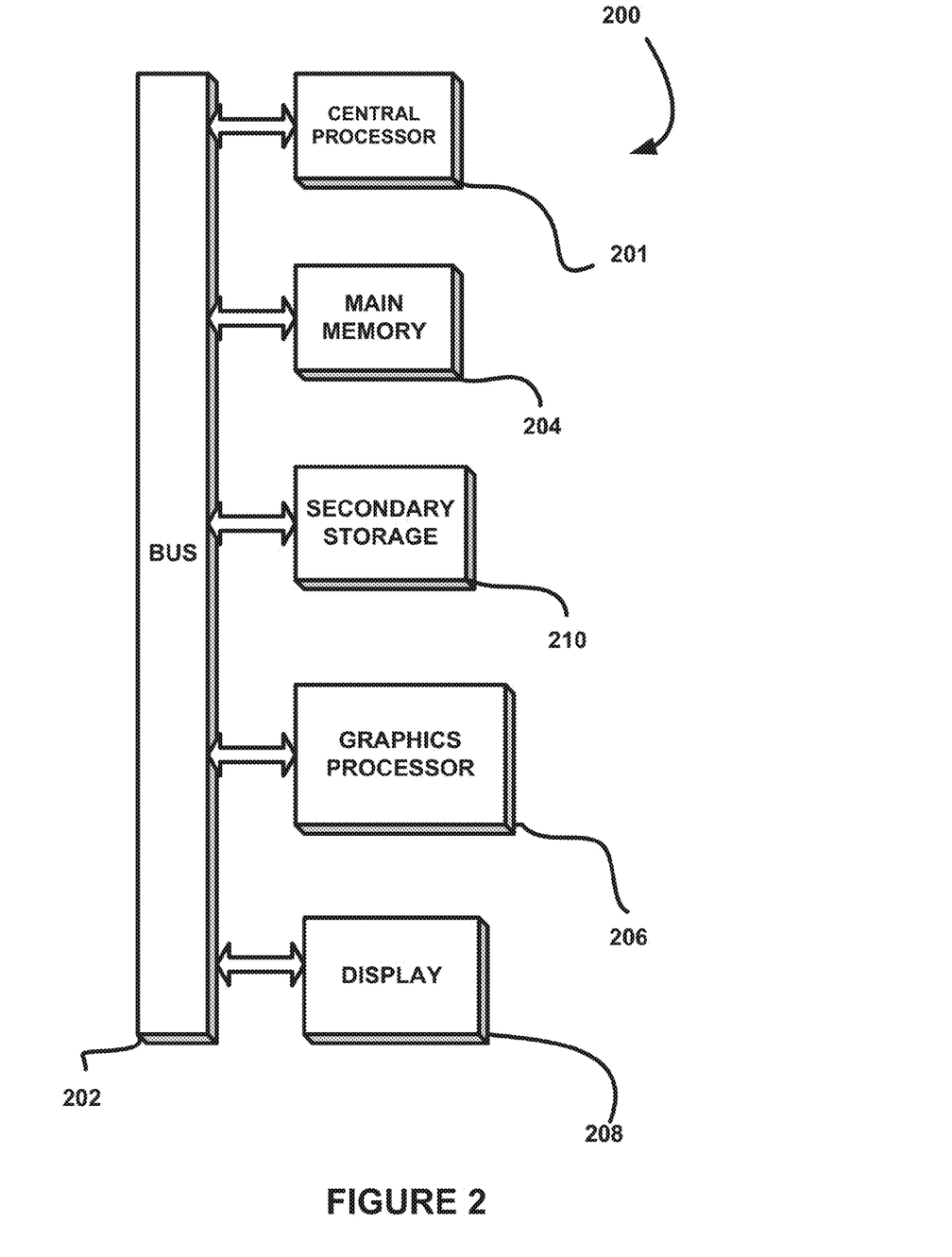
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
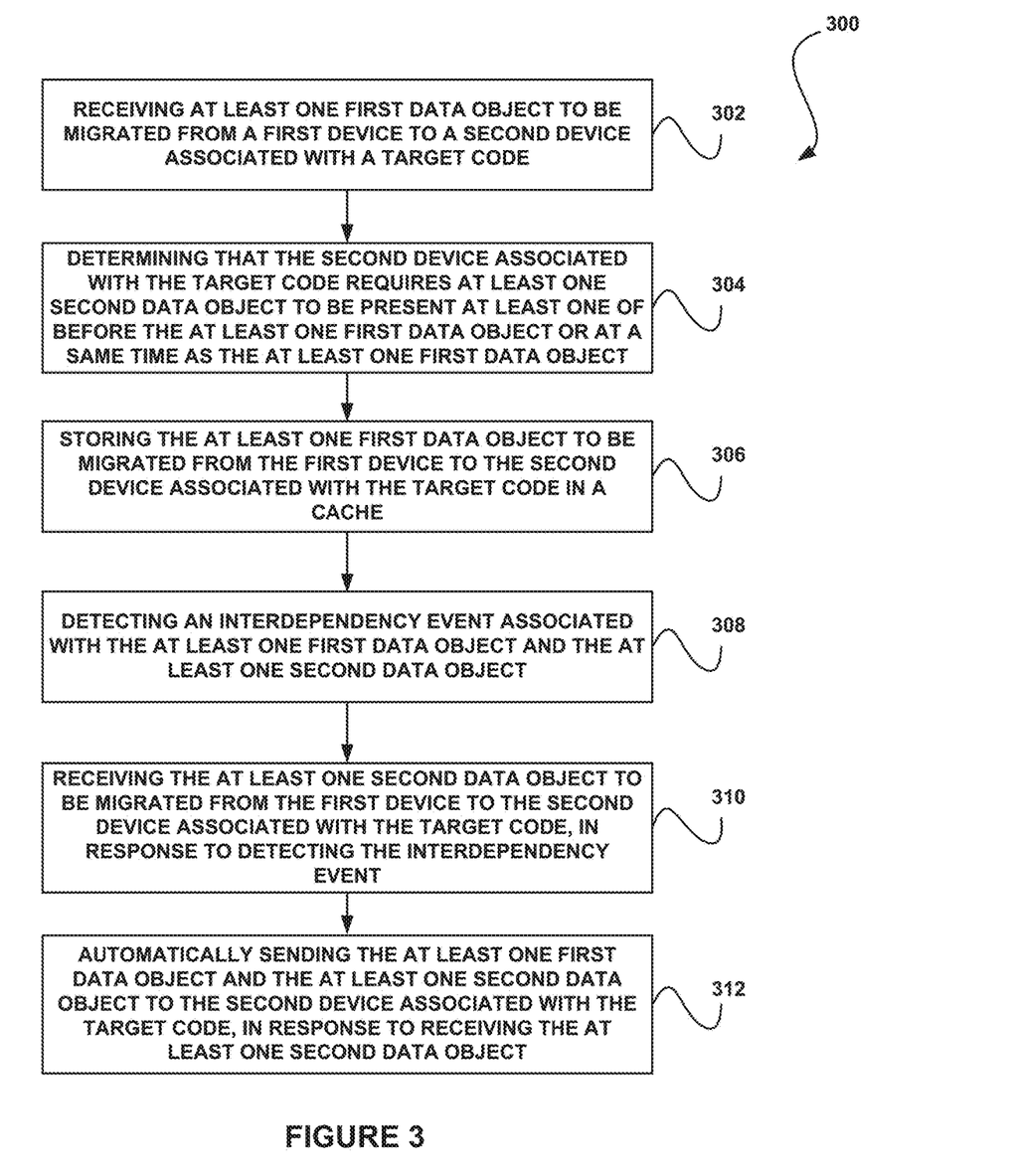
FIG. 3 illustrates a method for migrating interdependent data objects from a first device to a second device, in accordance with one embodiment.

FIG. 3 illustrates a method 300 for migrating interdependent data objects from a first device to a second device, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, at least one first data object to be migrated from a first device to a second device associated with a target code is received. See operation 302. In one embodiment, the first device may be associated with legacy code. In the context of the present description, legacy code refers to any computer code, computer program, software application, and/or combination thereof, that is associated with a software infrastructure. In one embodiment, the legacy code may represent applications or code associated with a current or past software infrastructure, which is to be updated to a new software infrastructure.

Similarly, target code may refer to any computer code, computer program, software application, and/or combination thereof, that is associated with a software infrastructure. In one embodiment, the target code may represent applications or code associated with a new software infrastructure that is to be updated from a current or past software infrastructure. For example, in one embodiment, the legacy code may represent multiple legacy applications and the target code may represent a single COTS (Commercial Off-The-Shelf) application.

The first device and the second device may include a variety of devices. For example, in various embodiments, the first device and/or the second device may include server devices, client devices, databases, cache memory, and/or various other types of devices.

Furthermore, the data objects may include any data object associated with first device and/or the target code. For example, in one embodiment, the data objects may include data objects generated by the first device.

As shown further in FIG. 3, it is determined that the second device associated with the target code requires at least one second data object to be present at least one of before the at least one first data object or at a same time as the at least one first data object. See operation 304. For example, an existence of the first data object in the second device associated with the target code may be dependent on an existence of the second data object in the second device.

In this case, the dependency may be based on target code requirements. For example, the legacy code may allow for the first data object to be created and exist prior to the second data object existing, but the target code may not. In other words, the legacy code and the target code may have different data object dependency requirements.

In one embodiment, the target code may allow for the first data object to arrive at the second device at the same time as the second data object. In another embodiment, the first data object may have to arrive at the second device after the second data object.

With further reference to FIG. 3, the at least one first data object to be migrated from the first device to the second device associated with the target code is stored in a cache. See operation 306. In this case, the first data object may be stored in the cache until the second data object is available, based on an interdependency requirement.

Thus, an interdependency event associated with the at least one first data object and the at least one second data object is detected. See operation 308. The interdependency event may include any event that is required to occur before the first data object and the second data object may exist in the second device concurrently. In various embodiments, the interdependency event may include the updating of one or more data objects, the deleting of one or more data objects, and/or the creation of one or more data objects.

For example, in one embodiment, the interdependency event may include the creation of the second data object. In one embodiment, the creation of the second data object may be detected based on the receipt of the second data object (e.g. at a sequencer device, etc.). In another embodiment, the creation of the second data object may be detected based on the receipt of an indication of the creation of the second data object.

For example, in one embodiment, a key associated with the second data object (and/or the first data object) may be created when the data object is created. In one embodiment, the key associated with the data object may indicate data object dependencies associated with the particular data object.

As shown further in FIG. 3, the at least one second data object to be migrated from the first device to the second device associated with the target code is received. See operation 310. Moreover, the at least one first data object and the at least one second data object are automatically sent to the second device associated with the target code, in response to receiving the at least one second data object. See operation 312.

In one embodiment, the method 300 may be implemented utilizing a sequencing device capable of sequencing the data objects in a manner that fits with the requirements of the target code. In this case, the first data object and the second data object may be received by the sequencer device, etc. Additionally, in one embodiment, the sequencing device may ensure that the first device and the second device associated with the target code are capable of receiving data objects in a common format.

Further, in one embodiment, the method 300 may include receiving a transaction associated with the first data object from the first device. In this case, a plurality of source objects associated with the transaction may also be received from the first device, where the plurality of source objects include the first data object.

Additionally, a plurality of keys associated with one or more dependent source objects associated with the source objects may be retrieved (e.g. by the sequencing device, etc.). In this case, utilizing each of the keys, a lookup may be performed in the cache for dependencies. In one embodiment, the cache may include the cache where the first data object is stored. In another embodiment, the cache may include a cache associated with the keys and dependency indicators.

In either case, in one embodiment, each of the keys may exist in the cache as a source key, where the source key corresponds to an associated dependent source object. In one embodiment, if one or more of the keys are not found in the cache, the transaction and the source objects may be stored in the cache until all dependencies associated with each of the source objects have been successfully processed. In this case, processing the dependencies associated with each of the source objects may include receiving the second data object. The transaction and the source objects may be sent to the second device when all dependencies have been successfully processed.

Accordingly, in one embodiment, the method 300 may further include associating at least one source key with the second data object and/or the first data object. In one embodiment, the source key associated with the second data object may be published. In this case, the publishing of the source key associated with the second data object may be utilized to detect the creation of the second data object.

Based on detecting the creation of the second data object, it may be determined that the first data object can be released from the cache. In response to determining that the first data object can be released from the cache, the first data object and the second data object may be sent to the second device associated with the target code. Thus, the method 300 may be implemented for migrating interdependent data objects from legacy code to target code.

In one embodiment, this technique may be utilized in the context applications managing the same real-world entities with significantly different data models associated with constraints that fundamentally change the sequence or order in which transactions can be applied.

For example, System X may require objects of type $T_1$ to be created before objects of type $T_2$, whereas System Y may require objects of type $T_2$ to be created before objects of type $T_1$. A transaction in System X that creates an instance of type $T_1$ could not be immediately replicated to System Y because System Y first requires a related instance of type $T_2$ to be created. Once System X runs a second transaction that creates the related instance of type $T_2$ at a later time, this instance can be replicated to System Y, followed by the previously captured instance of type $T_1$.

The time delays between the source transactions may be milliseconds or days but the issue is the same in that the order of the transactions on the source system has to be re-sequenced to an order that is executable on the target system. Accordingly, the techniques described herein may function to resolve issues around elapsed time and different constraint models by caching captured source transactions until the sequence required by the target system can be fulfilled.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
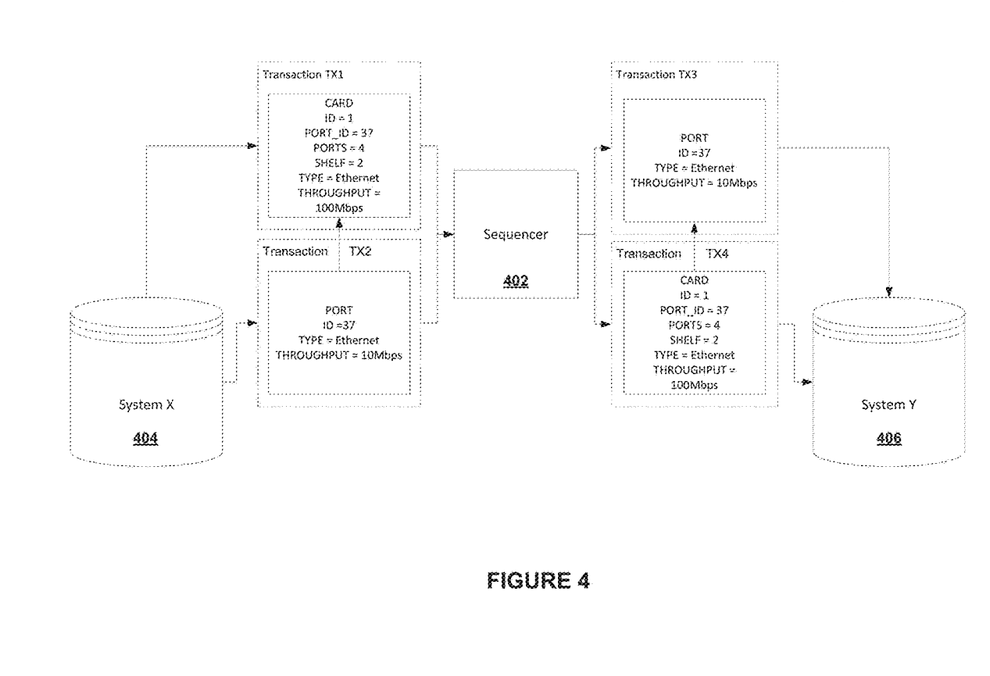
FIG. 4 illustrates a system for migrating interdependent data objects from a first device to a second device, in accordance with one embodiment.

FIG. 4 illustrates a system 400 for migrating interdependent data objects from a first device to a second device, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

As shown, the system 400 includes a sequencer device 402 in communication with a first system 404 (System X) and a second system 406 (System Y). As shown further, System X has produced two separate transactions, $TX_1$ and $TX_2$. Transaction $TX_1$ contains the creation of a card and $TX_2$ contains the creation of a port.

In System X the existence of the port is dependent on the existence of a parent card and cannot exist on its own. When transaction $TX_1$ is detected, the transaction and its card are passed to the sequencer 402. The sequencer 402 is aware that System Y requires ports to be created before cards and determines to cache the card from transaction $TX_1$.

When transaction $TX_2$ is detected, the transaction and its port are passed to the sequencer 402. The sequencer 402 now has the two related objects required by System Y and thus releases the objects for processing. Both transactions captured on the source application are processed only after the sequencer has confirmed that all dependent objects are available.

Figure 5:
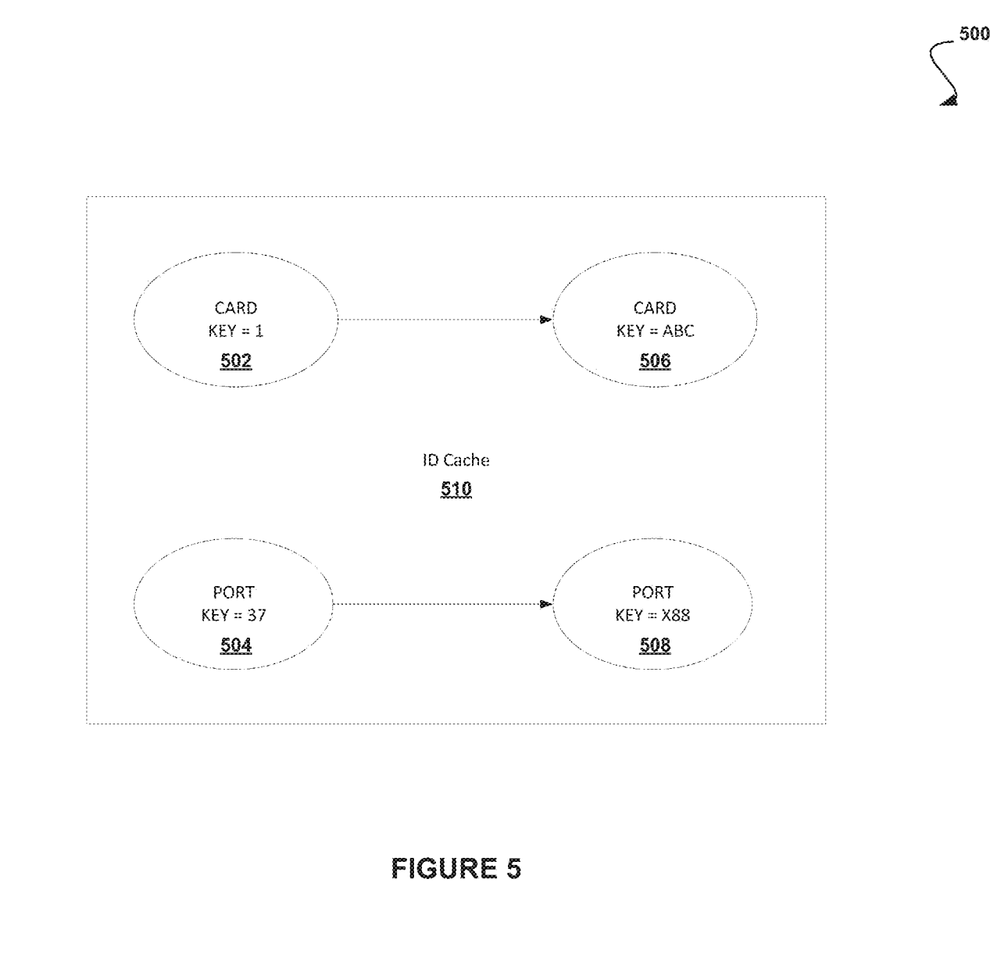
FIG. 5 illustrates a memory including data objects, in accordance with one embodiment.

FIG. 5 illustrates a memory 500 including data objects, in accordance with one embodiment. As an option, the memory 500 may be implemented in the context of the details of FIGS. 1-4. Of course, however, the memory 500 may be implemented in the context of any desired environment. Further, the aforementioned definitions may equally apply to the description below.

FIG. 5 details how primary keys of source objects 502 and 504, and target objects 506 and 508 may be linked internally within a cache 510 (e.g. an identity, or primary key cache, etc.).

In use, the cache 510 may be utilized to maintain relationships between source and target keys. Further, the cache 510 may function to enable a sequencer (e.g. the sequencer 402) to verify the existence of dependencies, by looking up objects using source identifiers.

If a source object that has a reference (and therefore a dependency) to another source object arrives at the target application, this dependency can be verified by looking up the source object in the cache 510. If the source key is found, the object exists and that the dependent object can be processed.

In one embodiment, the sequencing associated with the sequencer may assume a common internal format between the source (i.e. legacy) and target applications. Further, the sequencing implementation may utilize an ID cache component that manages relationships between keys of associated objects across system boundaries, as outlined in FIG. 5. Additionally, in one embodiment, another cache may exist where source objects may be entered while waiting for dependent objects to arrive.

In one embodiment, if a transaction containing source objects with dependencies that have not been previously observed by the cache 510 arrives at the target system, the transaction and its contents may be temporarily held in a sequencer cache until all dependencies have been successfully processed. One example of this is illustrated in FIG. 6.

Figure 6:
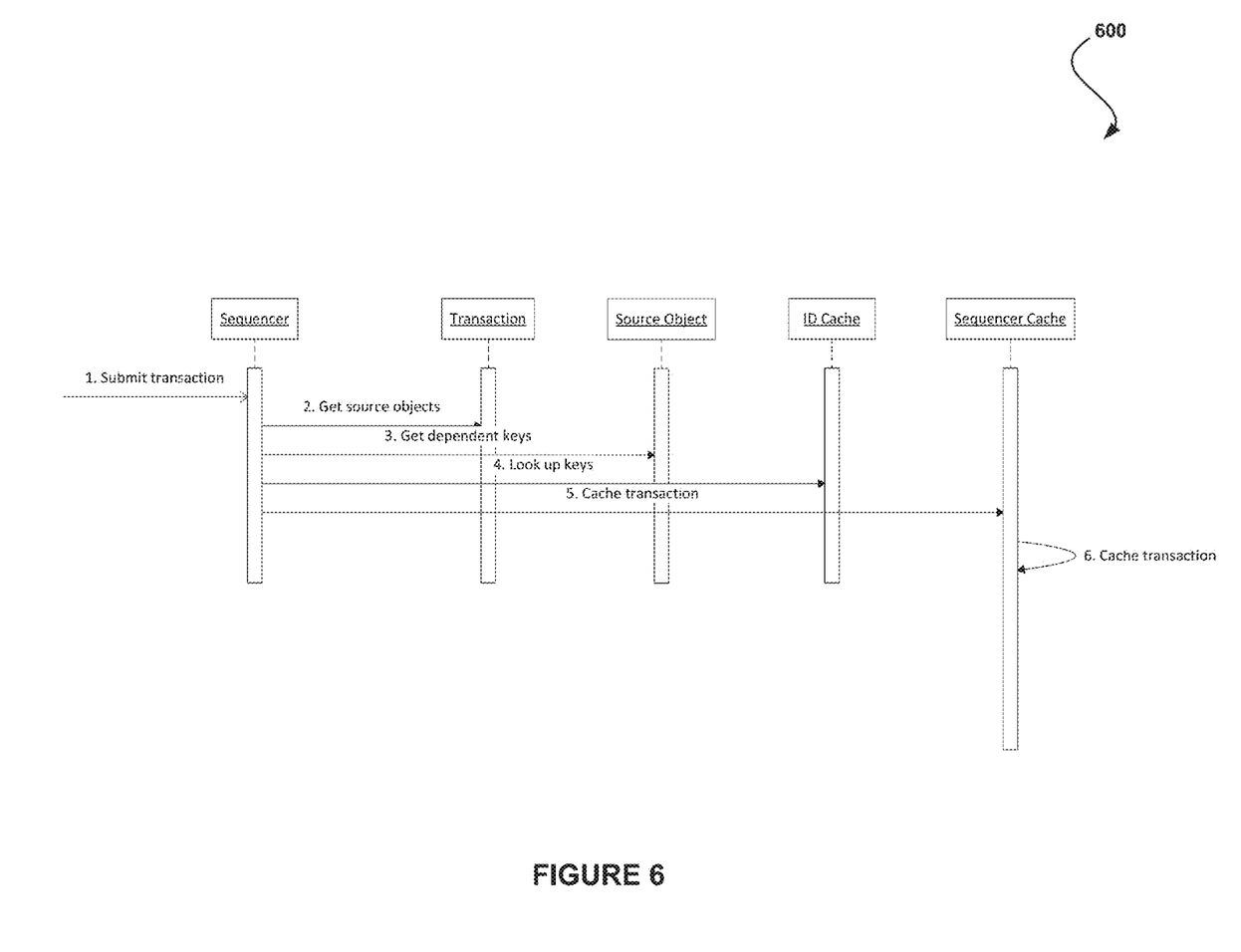
FIG. 6 illustrates a flow diagram for migrating interdependent data objects from a first device to a second device, in accordance with one embodiment.

FIG. 6 illustrates a flow diagram 600 for migrating interdependent data objects from a first device to a second device, in accordance with one embodiment. As an option, the flow diagram 600 may be implemented in the context of the details of FIGS. 1-5. Of course, however, the flow diagram 600 may be implemented in the context of any desired environment. Further, the aforementioned definitions may equally apply to the description below.

FIG. 6 details the processing of a transaction containing objects with missing dependencies, in accordance with one embodiment. As shown, a transaction is submitted to the sequencer component. See step 1.

In response, the sequencer retrieves all source objects contained within the transaction. See step 2. There may be many source objects of different types contained within a single transaction.

The sequencer retrieves all keys to dependent source objects contained within each source object extracted from the transaction. See step 3. Furthermore, the sequencer performs a lookup in the ID cache for every key retrieved in the previous step. See step 4. In this case, each key must exist in the ID cache as a source key in order for the dependency to be fulfilled.

If one or more keys could not be found in the ID cache, it is determined that there are missing dependencies. The transaction and its contained source objects are forwarded to the sequencer cache until all dependencies have been successfully processed. See step 5.

The sequencer cache stores the transaction and the missing key dependencies that caused it to require caching. See step 6. The sequencer cache may regularly inspect the transactions in the sequencer cache in order to evaluate if all dependencies have been fulfilled. If all dependencies have been fulfilled, the transaction may be released for processing. One example of this is illustrated in FIG. 7.

Figure 7:
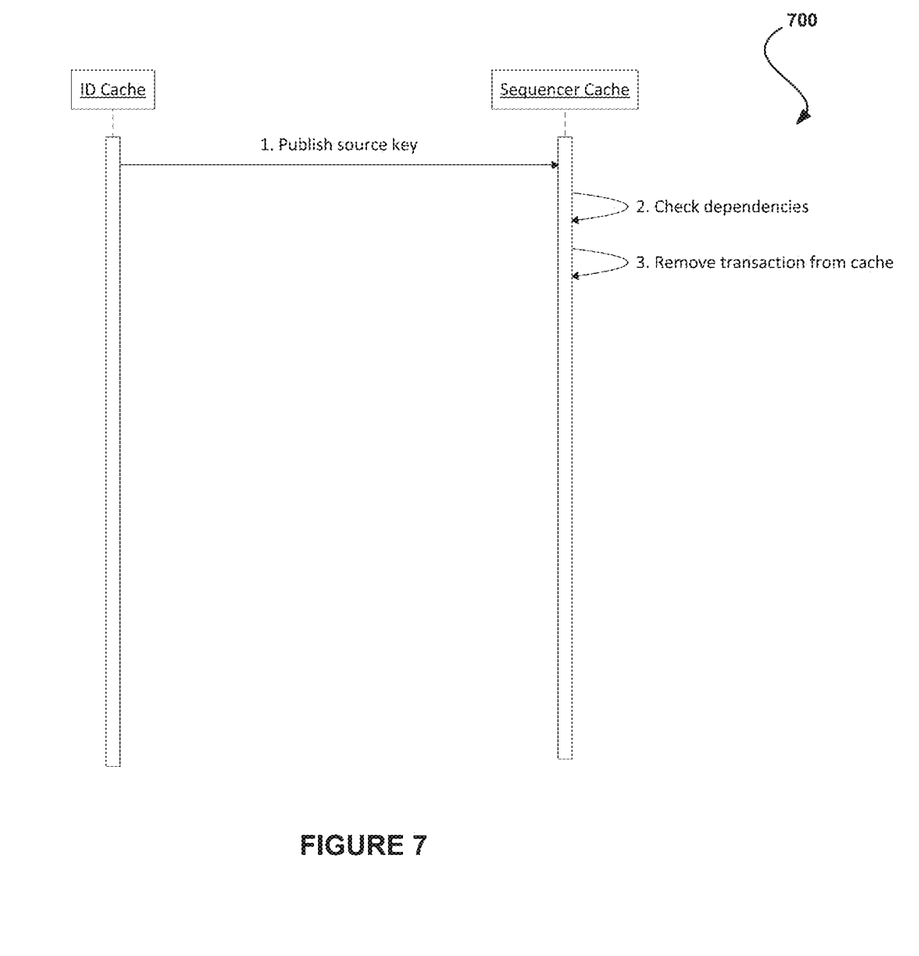
FIG. 7 illustrates a flow diagram for migrating interdependent data objects from a first device to a second device, in accordance with another embodiment.

FIG. 7 illustrates a flow diagram 700 for migrating interdependent data objects from legacy code to target code, in accordance with another embodiment. As an option, the flow diagram 700 may be implemented in the context of the details of FIGS. 1-6. Of course, however, the flow diagram 700 may be implemented in the context of any desired environment. Further, the aforementioned definitions may equally apply to the description below.

As shown, FIG. 7 details the release of cached transactions, where all dependencies have become available. In operation, the ID cache may publish source keys that have been successfully created in the target application. See step 1. The sequencer cache may subscribe to these notifications and use them as a trigger for evaluating if any cached transactions can be released for processing.

The sequencer cache checks to determine if the source key is associated with any of the cached transactions. See step 2. For the rest of the diagram it is assumed there are matching keys stored in the sequencer cache. If a cached transaction no longer has any outstanding source dependencies, it is removed from the sequencer cache and released for processing. See step 3.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for receiving at least one first data object to be migrated from a first device to a second device associated with a target code;
   computer code for determining that the second device associated with the target code has a requirement that at least one second data object be present in the second device with the at least one first data object, including that either:
   (1) the second device associated with the target code requires the at least one second data object to be present in the second device before the at least one first data object is migrated to the second device, or
   (2) allows the at least one second data object to be migrated to the second device at a same time as the at least one first data object;
   computer code for storing the at least one first data object to be migrated from the first device to the second device associated with the target code in a cache, responsive to determining the requirement of the second device;
   computer code for detecting an interdependency event that includes creation of the at least one second object in the first device;
   computer code for receiving the at least one second data object to be migrated from the first device to the second device associated with the target code, in response to detecting the interdependency event; and
   computer code for automatically sending the at least one first data object and the at least one second data object to the second device associated with the target code, in response to receiving the at least one second data object, including:
   (1) when the second device associated with the target code requires the at least one second data object to be present in the second device before the at least one first data object is migrated to the second device, then automatically sending the at least one second data object to the second device associated with the target code prior to automatically sending the at least one first data object to the second device associated with the target code, and
   (2) when the second device associated with the target code allows the at least one second data object to be migrated to the second device at a same time as the at least one first data object, then automatically sending the at least one second data object with the at least one first data object to the second device associated with the target code.

2. The computer program product of claim 1, wherein the computer program product is operable such that the first device and the second device associated with the target code are capable of receiving data objects in a common format.

3. The computer program product of claim 1, wherein the computer program product is operable such that the at least one first data object and the at least one second data object are received by a sequencer device.

4. The computer program product of claim 1, further comprising computer code for receiving a transaction associated with the at least one first data object from the first device.

5. The computer program product of claim 4, further comprising computer code for receiving a plurality of source objects associated with the transaction from the first device, the plurality of source objects including the at least one first data object.

6. The computer program product of claim 5, further comprising computer code for retrieving a plurality of keys associated with one or more dependent source objects associated with the plurality of source objects.

7. The computer program product of claim 6, further comprising computer code for performing a lookup in the cache utilizing each of the plurality of keys.

8. The computer program product of claim 6, wherein the computer program product is operable such that each of the plurality of keys exist in the cache as a source key, the source key corresponding to an associated dependent source object.

9. The computer program product of claim 6, wherein the computer program product is operable such that if one or more of the plurality of keys are not found in the cache, the transaction and the plurality of source objects are stored in the cache until all dependencies associated with each of the plurality of source objects have been successfully processed, wherein the computer program product is operable such that processing the dependencies associated with each of the plurality of source objects includes receiving the at least one second data object.

10. The computer program product of claim 9, wherein the computer program product is operable such that the transaction and the plurality of source objects are sent to the second device when all dependencies have been successfully processed.

11. The computer program product of claim 1, further comprising computer code for associating at least one source key with the at least one second data object.

12. The computer program product of claim 11, further comprising computer code for causing publishing of the at least one source key associated with the at least one second data object.

13. The computer program product of claim 12, wherein the computer program product is operable such that publishing of the at least one source key associated with the at least one second data object is utilized to detect the creation of the at least one second data object.

14. The computer program product of claim 13, further comprising computer code for determining that the first data object can be released from the cache, based on detecting the creation of the at least one second data object.

15. The computer program product of claim 14, further comprising computer code for automatically sending the first data object and the at least one second data object to the second device associated with the target code, in response to determining that the first data object can be released from the cache.

16. The computer program product of claim 1, wherein the computer program product is operable such that the first device includes a first database including legacy code and the second device includes a second database including the target code.

17. A method, comprising:
receiving at least one first data object to be migrated from a first device to a second device associated with a target code;
determining that the second device associated with the target code has a requirement that at least one second data object be present in the second device with the at least one first data object, including that either:
(1) the second device associated with the target code requires the at least one second data object to be present in the second device before the at least one first data object is migrated to the second device, or
(2) allows the at least one second data object to be migrated to the second device at a same time as the at least one first data object;
storing the at least one first data object to be migrated from the first device to the second device associated with the target code in a cache, responsive to determining the requirement of the second device;
detecting an interdependency event that includes creation of the at least one second object in the first device;
receiving the at least one second data object to be migrated from the first device to the second device associated with the target code, in response to detecting the interdependency event; and
automatically sending the at least one first data object and the at least one second data object to the second device associated with the target code, in response to receiving the at least one second data object, including:
(1) when the second device associated with the target code requires the at least one second data object to be present in the second device before the at least one first data object is migrated to the second device, then automatically sending the at least one second data object to the second device associated with the target code prior to automatically sending the at least one first data object to the second device associated with the target code, and
(2) when the second device associated with the target code allows the at least one second data object to be migrated to the second device at a same time as the at least one first data object, then automatically sending the at least one second data object with the at least one first data object to the second device associated with the target code.

18. A system comprising:
a memory system; and
one or more processing cores coupled to the memory system and that are each configured to:
receive at least one first data object to be migrated from a first device to a second device associated with a target code;
determine that the second device associated with the target code has a requirement that at least one second data object be present in the second device with the at least one first data object, including that either:
(1) the second device associated with the target code requires the at least one second data object to be present in the second device before the at least one first data object is migrated to the second device, or
(2) allows the at least one second data object to be migrated to the second device at a same time as the at least one first data object;
store the at least one first data object to be migrated from the first device to the second device associated with the target code in a cache, responsive to determining the requirement of the second device;
detect an interdependency event that includes creation of the at least one second object in the first device;
receive the at least one second data object to be migrated from the first device to the second device associated with the target code, in response to detecting the interdependency event; and
automatically send the at least one first data object and the at least one second data object to the second device associated with the target code, in response to receiving the at least one second data object, including:
(1) when the second device associated with the target code requires the at least one second data object to be present in the second device before the at least one first data object is migrated to the second device, then automatically sending the at least one second data object to the second device associated with the target code prior to automatically sending the at least one first data object to the second device associated with the target code, and
(2) when the second device associated with the target code allows the at least one second data object to be migrated to the second device at a same time as the at least one first data object, then automatically sending the at least one second data object with the at least one first data object to the second device associated with the target code.

19. The computer program product of claim 1, wherein the first device allows for the at least one first data object to exist therein prior to the at least one second data object existing therein.

20. The computer program product of claim 1,
wherein receiving the at least one first data object to be migrated from the first device to the second device associated with the target code includes:
receiving, at a sequencer with the at least one first data object, a first transaction containing a creation of the at least one first data object;
wherein the first transaction is stored in the cache with the at least one first data object;
wherein receiving the at least one second data object to be migrated from the first device to the second device associated with the target code, in response to detecting the interdependency event, includes:
receiving, at the sequencer with the at least one second data object, a second transaction containing a creation of the at least one second data object; and wherein sending the at least one first data object and the at least one second data object to the second device associated with the target code includes:
sending the first transaction and the second transaction with the least one first data object and the at least one second data object, respectively, to the second device associated with the target code for processing thereof.

* * * * *